R. G. LEDIG.
ADJUSTABLE VEHICLE SEAT.
APPLICATION FILED AUG. 4, 1909.
958,410.
Patented May 17, 1910.
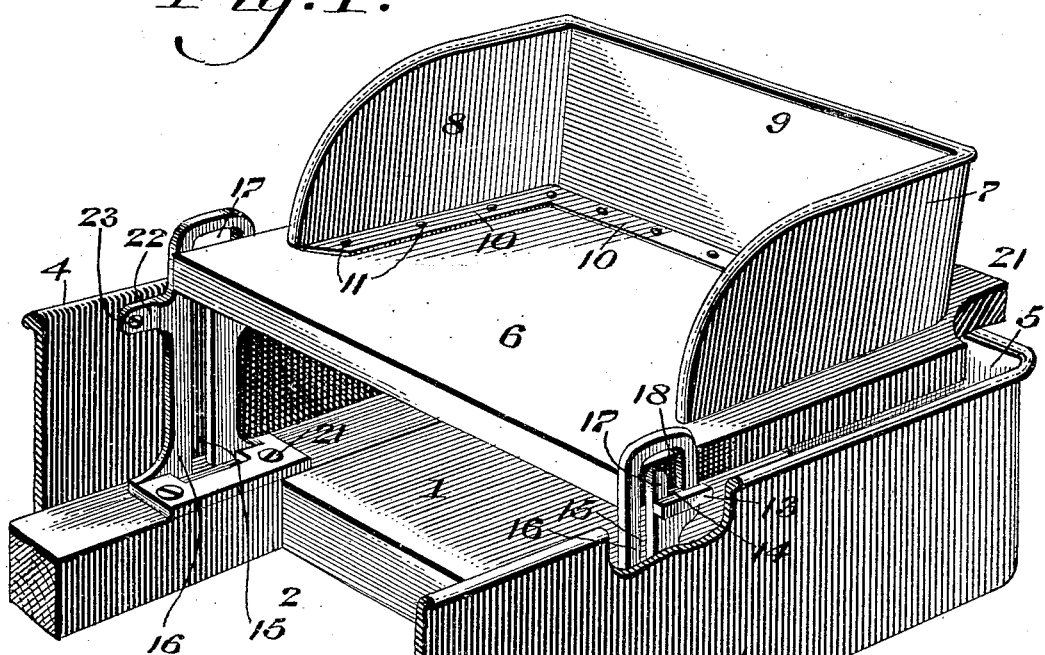
Fig. 1.
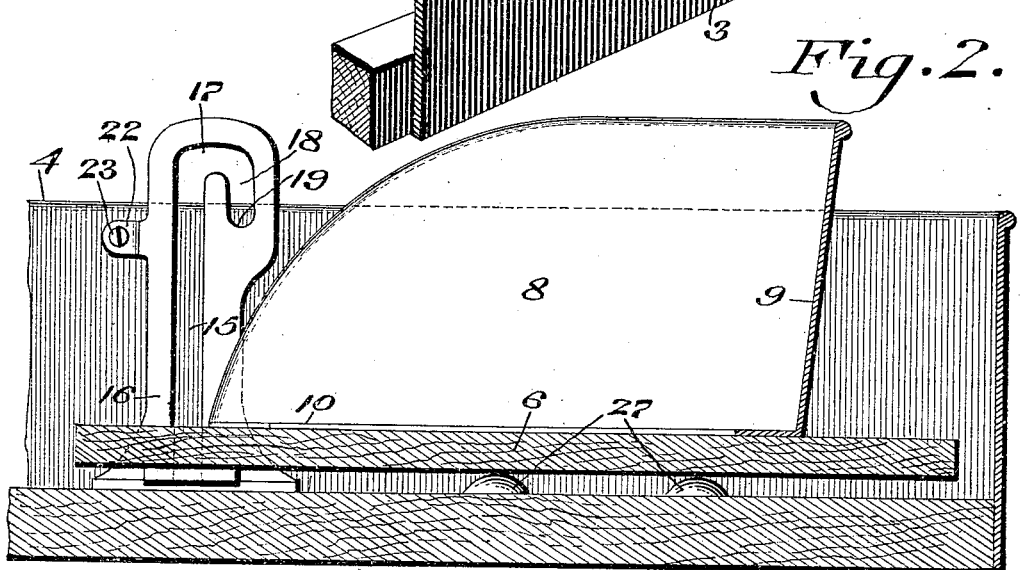
Fig. 2.
Fig. 3.
WITNESSES
P. F. Nagle.
L. Douville.
INVENTOR
Richard G. Ledig.
BY
Wiedersheim Fairbanks
ATTORNEYS

UNITED STATES PATENT OFFICE.

RICHARD G. LEDIG, OF PHILADELPHIA, PENNSYLVANIA, ASSIGNOR TO A. MECKY CO., OF PHILADELPHIA, PENNSYLVANIA, A CORPORATION OF PENNSYLVANIA.

ADJUSTABLE VEHICLE-SEAT.

958,410.   Specification of Letters Patent.   Patented May 17, 1910.

Application filed August 4, 1909. Serial No. 511,102.

*To all whom it may concern:*

Be it known that I, RICHARD G. LEDIG, a citizen of the United States, residing in the city and county of Philadelphia, State of Pennsylvania, have invented a new and useful Adjustable Vehicle-Seat, of which the following is a specification.

My invention relates to an adjustable vehicle seat and consists of means whereby the seat may occupy an elevated position on the upper portion of the body of the vehicle, or a lowered position within said body on or approximately the floor thereof.

A further purpose of my invention is to form a seat capable of resting within a vehicle body and to form guides and supports therefor by which it can be elevated and moved to another supporting position.

A further purpose of my invention is to provide guiding slots in side supports for the seat by which the seat may be permitted to rest within the body of the vehicle and may be thrown up and back and supported in that position upon the side supports and, in the example illustrated, upon the rear end of the body.

A further purpose of my invention is to make use of a reversely turned slot in a guide for the purpose of controlling movement of a seat and holding it in raised and longitudinally moved position, whereby the front of the seat is held by the support and the rear of the seat is held by any suitable support not interfering with the intermediate movement of the seat, here illustrated as the back of the body.

It further consists of other novel features of construction all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 is a broken perspective of one form of vehicle seat embodying my invention. Fig. 2 is a longitudinal section thereof. Fig. 3 is a broken detail perspective showing a portion of the structures of Fig. 1.

Similar numerals of reference indicate corresponding parts in the figures.

Referring to the drawings, 1 designates the floor of a vehicle body which I have shown as apertured at 2, as might be desirable for access to the propelling mechanism of the vehicle, and provided with sides 3 and 4 and back 5, forming the normal contour of the vehicle body, these parts being attached in any suitable manner. I provide a seat having a base 6, sides 7 and 8 and back 9 which latter parts I have shown as attached to the base by any suitable means, such as the flanges 10 and pins 11. Upon the sides of said base 6 and near the front of it I have conveniently located plates 12 preferably having T-shaped ends in the form of heads 13 and necks 14, these necks 14 being intended to operate through slots 15 in standards or supports 16, said heads being on the outside of said standards. The slots 15 are extended in any suitable shape from the approximate bottom of the support 16 to a desired height where they are rearwardly extended at 17 and reversely turned at 18 and lowered to provide additional rests 19 for the necks 14, with the purpose and effect that said necks and therefore the front end of the seat may be guided by the said slots and placed therein securely either at the bottom of the said slots 15 or on the bottom of said rests 19 corresponding to the desirable lower and upper positions of the seat.

The standards or supports 16 are preferably formed of metal and provided with lateral flanges 20 for attachment upon the sills of the vehicle, as by screws 21, and are preferably additionally supported against the sides of the vehicle body by means of ears 22 and any suitable fastening means, such as screws 23, and are provided, in the form shown, with slots 24 through which the heads 13 may be introduced before securing the standards in position. I would call attention, however, to the fact that the heads can be inserted also by turning them so as to extend longitudinally with respect to the slots 15 and inserting them laterally therein either before mounting the standards or by springing the sides and turning the seat afterward. The ears 22 permit the standards to be supported and braced at a sufficient distance within the sides of the vehicle body for the heads 13 to have free play between the standards and the sides of the said body.

It will be evident that the necessity for the heads 13 depends upon the rigidity of the side structure, including the standards and the side of the vehicle body as they can be dispensed with if this rigidity is sufficient to avoid danger of the necks 14 escaping from the slots in the use to which the vehicle will be subjected, as these necks 14 can evidently be formed as pins driven into the top of the base of the seat or fastened by such fastening means as is provided for by apertures 25 in the extensions or plates 12.

When the necks 14 lie within the slots 15 the rear end 26 of the base of the seat is held at a sufficient distance from the back 5 of the body to permit the seat to be fully within the body of the vehicle on the floor thereof. The rear end 26 is placed sufficiently near to the back of the vehicle body or to any suitable support therein or thereon for it to engage with the back of the body or with such support when the necks 14 lie within the reverse portions 18 of the slots with the effect that the rear portion of the seat is supported in its elevated position at the same time that the necks 14 or pins serving their purpose rest on the rests 19 in the said slots. In the lowered position of the seat I prefer to have it rest upon a plurality of cushions 27 which may be of any yielding material and which will relieve the jar upon the seat in the ordinary use of the vehicle.

I direct attention to the fact that the several positions of the vehicle seat are substantially in line with each other, preferably making use therefore of the extreme rear portion of the vehicle for this purpose, at the same time that they permit of a variety of positions adapted to the use of different persons and to different uses of the vehicle.

It will be evident that other forms of guides and supports therein may be made use of by me or by others without departing from the spirit or scope of this invention and that the supports on the rear end of the seat in its elevated position may be accomplished by a variety of means other than the specific one shown without departing from the invention.

Having thus described my invention, what I claim as new and desire to secure by Letters Patent, is:—

1. In a vehicle, guides on the body thereof, a seat means on said seat engaging said guides, the latter comprising standards having therein slots composed of two vertically-extending parts of differential lengths joining each other at top, the upper part being continued downwardly partly from said top forming a rest for the front of the seat below said top, the rear of said seat being adapted to rest freely on the back of the vehicle body.

2. In a device of the character stated, a vehicle body, a plurality of guides therein, each having therein vertically-extending slots of differential lengths in communication at top, the upper slot being continued downwardly partly from said top and the other slot extending to the bottom of a guide, providing vertical and longitudinal movement, a vehicle seat connected with said guides to move vertically and longitudinally, and means for supporting the opposite end of the seat in the longitudinally moved position of said seat on the floor or back of the vehicle body.

3. In a device of the character stated, a vehicle body, a seat, standards on said body each having therein a plurality of vertically extending slots of differential lengths joining each other at top, the upper slot being continued downwardly partially from said top, and means on the seat slidably fitted in said slots, standards to direct the seat vertically and longitudinally therein and permit the seat to be elevated and moved rearwardly and sustained on the upper portion of the body of the vehicle, or lowered and moved forwardly and sustained on or approximately on the floor thereof.

4. In a device of the character stated, a vehicle body, a plurality of guides therein, a vehicle seat, and means upon said seat engaging with said guides to direct the seat vertically and longitudinally, said guides having each therein, a plurality of vertically-extending slots of differential lengths, in communication at top, the upper slot extending partially downward from said top.

RICHARD G. LEDIG.

Witnesses:
HOWARD P. CHESTER,
CHARLES WINTGENS.